United States Patent
Ito et al.

(10) Patent No.: US 10,125,819 B2
(45) Date of Patent: Nov. 13, 2018

(54) SINTERED BEARING

(71) Applicants: Yoshinori Ito, Aichi (JP); Takahiro Gotou, Aichi (JP)

(72) Inventors: Yoshinori Ito, Aichi (JP); Takahiro Gotou, Aichi (JP)

(73) Assignee: NTN CORPORATION, Osaka (JP)

( * ) Notice: Subject to any disclaimer, the term of this patent is extended or adjusted under 35 U.S.C. 154(b) by 693 days.

(21) Appl. No.: 14/414,555

(22) PCT Filed: Jul. 23, 2013

(86) PCT No.: PCT/JP2013/069847
§ 371 (c)(1),
(2) Date: Jan. 13, 2015

(87) PCT Pub. No.: WO2014/017456
PCT Pub. Date: Jan. 30, 2014

(65) Prior Publication Data
US 2015/0139847 A1 May 21, 2015

(30) Foreign Application Priority Data

Jul. 26, 2012 (JP) ................................ 2012-165844

(51) Int. Cl.
*C22C 32/00* (2006.01)
*F16C 33/12* (2006.01)
(Continued)

(52) U.S. Cl.
CPC .......... *F16C 33/128* (2013.01); *B22F 1/0003* (2013.01); *B22F 1/0059* (2013.01);
(Continued)

(58) Field of Classification Search
None
See application file for complete search history.

(56) References Cited

U.S. PATENT DOCUMENTS 2,974,039 A * 3/1961 Deventor ............ C22C 32/0084
419/11
4,000,981 A 1/1977 Sugafuji et al.
(Continued)

FOREIGN PATENT DOCUMENTS

| CN | 101029658 | 9/2007 |
| CN | 101303047 | 11/2008 |

(Continued)

OTHER PUBLICATIONS

International Search Report dated Sep. 3, 2013 in International (PCT) Application No. PCT/JP2013/069847.
(Continued)

*Primary Examiner* — Jessee R Roe
*Assistant Examiner* — Ngoclan T Mai
(74) *Attorney, Agent, or Firm* — Wenderoth, Lind & Ponack, L.L.P.

(57) ABSTRACT

Provided is a sintered bearing (1) obtained by molding raw material powders containing graphite powder and metal powder in a mold, followed by sintering, in which: the graphite powder to be used includes granulated graphite powder; and a ratio of free graphite in a bearing surface (1a) of the sintered bearing is set to from 25% to 80% in terms of an area ratio. An average grain size of the granulated graphite powder is set to from 60 μm to 500 μm. A blending ratio of the granulated graphite powder in the raw material powders is set to from 3 wt % to 15 wt %.

2 Claims, 6 Drawing Sheets

(51) Int. Cl.
    *F16C 33/16* (2006.01)
    *F16C 33/24* (2006.01)
    *B22F 5/10* (2006.01)
    *B22F 1/00* (2006.01)
    *B22F 3/11* (2006.01)
    *F16C 33/14* (2006.01)
    *B22F 3/26* (2006.01)
    *F16C 33/10* (2006.01)
    *B22F 3/02* (2006.01)

(52) U.S. Cl.
    CPC .............. *B22F 3/11* (2013.01); *B22F 3/26* (2013.01); *B22F 5/106* (2013.01); *F16C 33/145* (2013.01); *F16C 33/16* (2013.01); *F16C 33/24* (2013.01); *B22F 3/02* (2013.01); *B22F 2998/10* (2013.01); *F16C 33/104* (2013.01)

(56) References Cited

U.S. PATENT DOCUMENTS

| | | | |
|---|---|---|---|
| 2007/0212248 | A1 | 9/2007 | Nii et al. |
| 2008/0146467 | A1* | 6/2008 | Takayama ............ B22F 3/1035 508/105 |
| 2012/0145284 | A1 | 6/2012 | Ishii et al. |
| 2012/0177528 | A1 | 7/2012 | Takayama |
| 2013/0182979 | A1 | 7/2013 | Ito et al. |

FOREIGN PATENT DOCUMENTS

| | | |
|---|---|---|
| DE | 25 45 876 | 7/1976 |
| EP | 0 053 301 | 6/1982 |
| JP | 2-38540 | 2/1990 |
| JP | 5-51708 | 3/1993 |
| JP | 11-117044 | 4/1999 |
| JP | 11-269508 | 10/1999 |
| JP | 2001-316688 | 11/2001 |
| JP | 2004-018940 | 1/2004 |
| JP | 2005-47760 | 2/2005 |
| JP | 2005-240159 | 9/2005 |
| JP | 2006-207783 | 8/2006 |
| JP | 2008-7795 | 1/2008 |
| JP | 2008-63663 | 3/2008 |
| JP | 2010-77474 | 4/2010 |
| JP | 2010-193621 | 9/2010 |
| JP | 2011-52252 | 3/2011 |
| JP | 2012-67893 | 4/2012 |

OTHER PUBLICATIONS

International Preliminary Report on Patentability and Written Opinion of the International Searching Authority dated Jan. 27, 2015 in International (PCT) Application No. PCT/JP2013/069847.
Office Action dated Sep. 30, 2016 in corresponding Japanese Application No. 2012-165844 (with English translation).
Extended European Search Report dated Jun. 10, 2016 in corresponding European Patent Application No. 13822555.2.
R. G. Sheppard et al., "Properties and Characteristics of Graphite for Industrial Applications", Nov. 2001, pp. 1-50, XP002598686, Retrieved from the Internet: URL:http://www.poco.com/LinkClick.aspx?fileticket=GeYKfG9Sqtk%3d&tabid=192&mid=719 [retrieved on Aug. 27, 2010].
Hugh O. Pierson, "Handbook of carbon, graphite, diamond, and fullerenes—Properties, Processing and Applications", Sep. 1, 1993, pp. 99 and 100, XP055108362, Retrieved from the Internet: URL:http://www.knovel.com/web/portal/basic_search/display?_EXT_KNOVEL_DISPLAY_bookid=242 [retrieved on Mar. 17, 2014].
Chinese Office Action dated May 18, 2016 in corresponding Chinese Patent Applicatino No. 201380038414.7 (partial English translation).
Notice of Opposition dated Nov. 28, 2017 in corresponding Japanese Application No. 2017-700971, with partial English translation.
Graphite Powder Catalog, p. 13, Dec. 2002, with partial English translation.
Communication pursuant to Article 94(3) EPC dated Jul. 20, 2017 in corresponding European Application No. 13 822 55.2.

* cited by examiner

SINTERED BEARING

TECHNICAL FIELD

The present invention relates to a sintered bearing comprising a sintered metal.

BACKGROUND ART

Sintered bearings have been widely used as bearings for a small precision motor by virtue of their excellent quietness. The sintered bearings are roughly divided into a copper-based sintered bearing mainly formed of copper, an iron-based sintered bearing mainly formed of iron, and a copper-iron-based sintered bearing mainly formed of copper and iron. A sintered bearing of any of those types is generally used after pores of its porous structure are impregnated with lubricating oil. For example, as a copper-iron-based sintered bearing impregnated with lubricating oil, there is known a sintered bearing obtained by using copper-based powder having a diameter of 45 μm or less, in which a ratio of copper and oil permeability are each specified within a predetermined range (see Patent Literature 1).

CITATION LIST

Patent Literature 1: JP 2012-67893 A

SUMMARY OF INVENTION

Technical Problem

Meanwhile, in some cases, use of lubricating oil is not preferred depending on a use environment of the sintered bearing. For example, in copying machines or printing machines, paper may be contaminated with lubricating oil leaking out from a bearing. In addition, in electrical components for automobiles, lubricating oil may deteriorate or evaporate in a short period owing to high temperature at a periphery of a bearing, and thus bearing performance may be impaired. Further, in some cases, electrostatic charging caused by electrical insulation between a shaft and a bearing due to lubricating oil causes a problem.

In such applications in which use of lubricating oil is not preferred, use of a so-called dry-type sintered bearing (dry bearing), which is not impregnated with lubricating oil may be considered. However, the dry bearing is inevitably liable to cause poor lubrication. Thus, when the dry bearing is used as it is, use conditions such as a rotation number and load are largely limited. In such circumstances, there may be adopted a measure for increasing a blending amount of graphite as a solid lubricant to be blended in raw material powders to improve self-lubricating performance of the bearing itself.

However, the specific gravity and grain size of graphite powder are much smaller than those of metal powder (for example, the specific gravity is about ¼ of that of metal powder). Therefore, as the blending amount of graphite is increased, the flowability of the entire raw material powders is reduced. That is, when the raw material powders are loaded into a mold for molding and compressed to form a green compact, the powders may have non-uniform fall velocities, and variations in weight, dimensions, density, or the like may be caused through segregation or the like. In addition, it is difficult to mix the raw material powders uniformly. This further promotes generation of such segregation in a sintered compact. Further, such raw material powders containing a great deal of graphite are difficult to compact, and hence the strength of the green compact is reduced. As a result, chips, fractures, cracks, or the like are liable to occur.

In addition, when tin is added to the raw material powders in order to improve a bonding strength between metal powders, graphite inhibits a bonding function between the metal powders exhibited by tin when the added amount of graphite in the raw material powders is large. Thus, the strength of the sintered compact is reduced.

In view of the above-mentioned circumstances, an object of the present invention is to provide a sintered bearing having a high strength and small variations in dimensions and bearing performance upon mass production.

Solution to Problem

According to one embodiment of the present invention, there is provided a sintered bearing, which is obtained by molding raw material powders containing graphite powder and metal powder in a mold, followed by sintering, in which: the graphite powder to be used comprises granulated graphite powder; and a ratio of free graphite in a bearing surface of the sintered bearing is set to from 25% to 80% in terms of an area ratio.

When the ratio of the free graphite in the bearing surface is set to 25% to 80% in terms of an area ratio as just described, lubricity on the bearing surface is improved. In addition, high lubricity can be obtained even in a dry state of being not impregnated with lubricating oil.

The blending amount of the graphite powder is required to be increased as compared to that in an existing product, because a great deal of graphite is freed in the bearing surface as described above. Even in such case, the weight of the graphite powder per powder can be increased by using the granulated powder of graphite, that is, larger-size powder obtained through granulation of fine powders of graphite. With this, the difference in weight per powder between the graphite powder and the metal powder is reduced, and thus the flowability of the raw material powders can be improved. In addition, the raw material powders can be mixed uniformly. Accordingly, the variations in dimensions and bearing performance due to segregation upon mass production can be reduced, and even a bearing having a complex shape can be produced. In addition, the strengths of a green compact and a sintered compact can be improved as compared to the cases in which a great deal of graphite exists in a dispersed manner, because the existence regions of graphite are aggregated.

In the above-mentioned construction, an average grain size of the granulated graphite powder is desirably set to from 60 μm to 500 μm.

A blending ratio of the granulated graphite powder in the raw material powders is desirably set to from 3 wt % to 15 wt %. For an existing product, there is no choice but to set the blending ratio of graphite to less than 3 wt % owing to the above-mentioned problems, but according to one embodiment of the present invention, 3 wt % or more of graphite powder can be blended. Therefore, a graphite structure can be formed in an extensive region of the bearing surface as described above.

An apparent density of the granulated graphite powder is desirably set to 1.0 g/cm$^3$ or less.

While the sintered bearing according to one embodiment of the present invention can be used as a dry bearing not impregnated with lubricating oil as described above, the sintered bearing according to one embodiment of the present invention can be also used as an oil-impregnated bearing impregnated with lubricating oil.

Advantageous Effects of Invention

According to one embodiment of the present invention, the lubricity on the bearing surface can be improved. In addition, the variations in bearing performance and dimensional accuracy due to segregation can be suppressed even upon mass production, and further, the strengths of the green compact and the sintered compact can be improved. In addition, even a sintered bearing having a complex shape can be produced, and a higher degree of freedom of the bearing shape can be achieved.

DESCRIPTION OF EMBODIMENTS

Embodiments of the present invention are hereinafter described with reference to the drawings.

Figure 1:
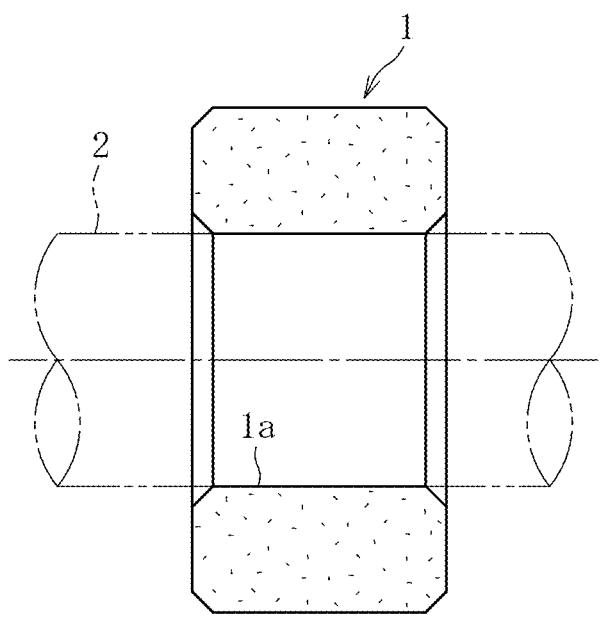
FIG. 1 is a sectional view of a sintered bearing according to one embodiment of the present invention in an axial direction.

In an embodiment of the present invention, a sintered bearing 1 is formed into a cylindrical shape having a bearing surface 1a on an inner periphery thereof, as illustrated in FIG. 1. A shaft 2 made of stainless steel or the like is inserted into the inner periphery of the sintered bearing 1. When the shaft or the bearing 1 is rotated in this state, an outer peripheral surface of the shaft 2 is supported by the bearing surface 1a of the bearing 1 in a rotatable manner.

The sintered bearing 1 of the present invention is formed by loading, into a mold, raw material powders obtained by mixing various powders, and compressing the raw material powders to form a green compact, followed by sintering the green compact.

The sintered bearing 1 according to this embodiment is a so-called copper-iron-based sintered bearing. Mixed powders containing copper powder, iron powder, low-melting point metal powder, and graphite powder as main components are used as the raw material powders. Various molding aids as typified by a lubricant (such as a metal soap) for improving mold releasability are added to the mixed powders as necessary. Now, detailed description is given of raw material powders and a manufacturing procedure for the sintered bearing 1 according to this embodiment.

[Copper Powder]

As the copper powder, spherical or dendritical copper powder generally used for a sintered bearing may be used widely. In this embodiment, electrolytic powder or water-atomized powder is used. Note that, powders obtained by mixing those powders may be used as well. The average grain size of the copper powder is set to, for example, from 40 μm to 160 μm, and the apparent density of the copper powder is set to, for example, from 1.5 to 3.0 g/cm$^3$. The apparent density is defined in conformity to the requirements of JIS Z 8901 (the same applies hereinafter). Flat copper powder may be used as the copper powder.

[Iron Powder]

As the iron powder, reduced iron powder, water-atomized iron powder, or other known powder may be used widely. In this embodiment, the reduced iron powder is used. The reduced iron powder has a substantially spherical shape as well as an irregular and porous shape. Further, the reduced iron powder has a sponge-like shape with minute projections and depressions provided on its surface, and hence the reduced iron powder is also called sponge iron powder. As the iron powder, there is used iron powder having a grain size of from 60 μm to 200 μm and an apparent density of from 2.0 to 3.0 g/cm$^3$. Note that, the oxygen content of the iron powder is set to 0.2 wt % or less.

[Low-Melting Point Metal Powder]

The low-melting point metal powder is metal powder having a melting point lower than the sintering temperature. In the present invention, metal powder having a melting point of 700° C. or less is used, and powder of tin, zinc, or phosphorus is used as an example. Of those, it is preferred to use tin, which is less evaporated at the time of sintering. In addition, atomized powder is used as the tin powder. Those low-melting point metal powders have a melting point of 700° C. or less, which is lower than the sintering temperature, and are less evaporated at the time of sintering. The tin powder has high wettability with respect to copper, and hence, when blended in the raw material powders, liquid phase sintering and solid phase sintering progress at the time of sintering. As a result, the bonding strength between an iron structure and a copper structure and the bonding strength between copper structures are increased.

[Graphite Powder]

As the graphite powder, larger-size granulated graphite powder obtained through granulation of fine powders of graphite is used. As the fine powder, flake or spherical natural graphite powder having an average grain size of 40 μm or less is used. The graphite powder after granulation has an average grain size of from 60 μm to 500 μm, and has an apparent density of 1.0 g/cm$^3$ or less. A phenol resin or the like is used as a binder for the granulation. The amount of the binder is desirably set to from 5 wt % to 15 wt % with respect to the fine powder of graphite.

[Blending Ratio]

The raw material powders are obtained by mixing the above-mentioned powders uniformly with a known mixer. The blending ratio of the graphite powder is set to from 3 wt % to 15 wt % (desirably from 5 wt % to 12 wt %) with respect to the raw material powders. The blending ratio of the low-melting point metal powder in the raw material powders can be arbitrarily determined, and for example, is set to from 1 wt % to 4 wt %. The blending ratios of the iron powder and the copper powder can be arbitrarily determined in consideration of the use conditions of the bearing and the cost.

[Molding]

Figure 2:
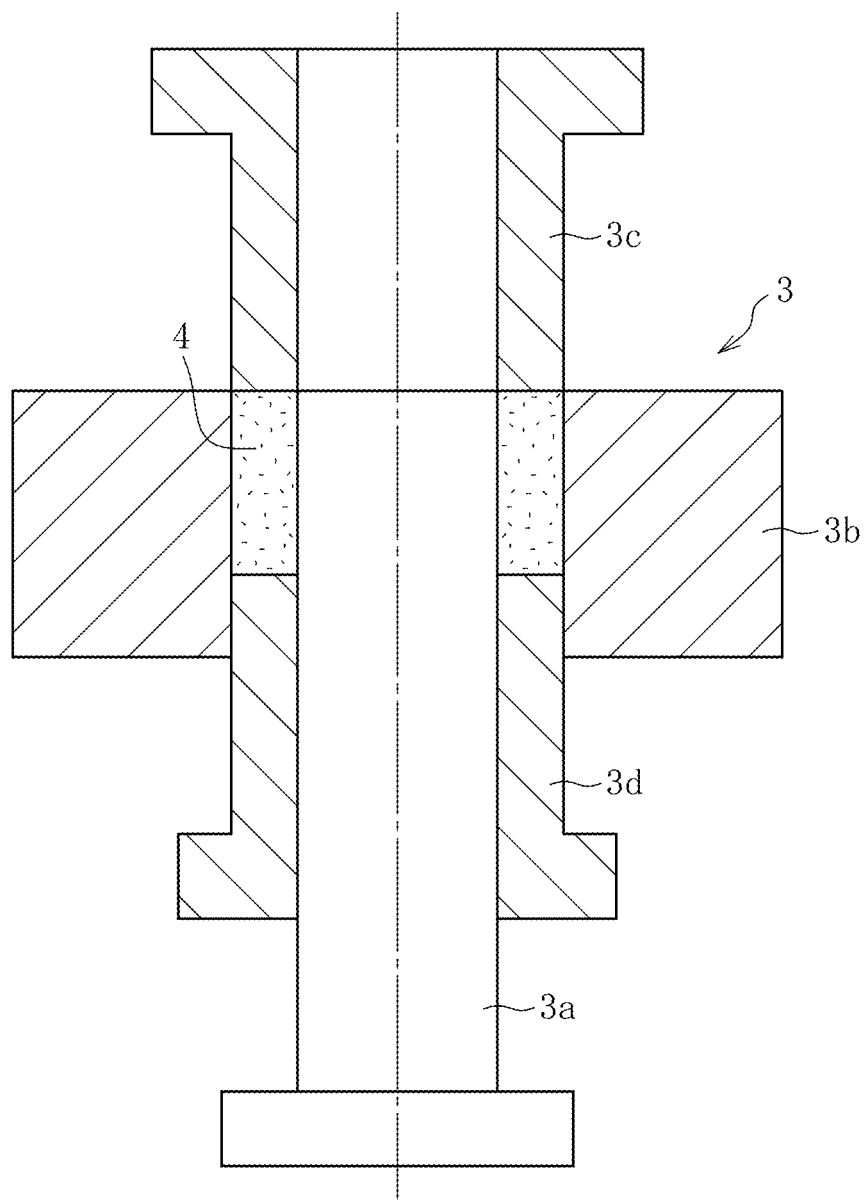
FIG. 2 is a sectional view illustrating a step of forming a green compact through use of a mold.

The raw material powders after mixing are fed to a mold 3 of a molding machine. As illustrated in FIG. 2, the mold 3 is constructed of a core 3a, a die 3b, an upper punch 3c, and a lower punch 3d, and the raw material powders are loaded into a cavity defined by those components of the mold 3. When the upper and lower punches 3c and 3d are brought close to each other to compress the raw material powders, the raw material powders are molded by a molding surface defined by an outer peripheral surface of the core 3a, an inner peripheral surface of the die 3b, an end surface of the upper punch 3c, and an end surface of the lower punch 3d, to thereby obtain a green compact 4 having a shape corresponding to the sintered bearing (having a cylindrical shape in this embodiment).

[Sintering]

After that, the green compact 4 is sintered in a sintering furnace. The sintering condition is set to such a condition that carbon contained in graphite does not react with iron (carbon does not diffuse). In the sintering, after the temperature becomes higher than 900° C., carbon (graphite) and iron start to react with each other to produce the pearlite phase γFe. When the pearlite phase γFe is produced, the amount of a free graphite structure in the bearing surface 1a is reduced, and hence the object of the present invention cannot be achieved. In addition, the pearlite phase γFe is a hard structure (HV 300 or more) and has significant aggressiveness to the mating member. Therefore, when the pearlite phase is precipitated excessively, the wear of the shaft 2 may be progressed.

In addition, in the manufacturing steps for the sintered bearing of the related art, endothermic gas (RX gas) obtained through thermal decomposition of a mixture of liquefied petroleum gas (such as butane and propane) and air with a Ni catalyst is often used as a sintering atmosphere. However, when the endothermic gas (RX gas) is used, carbon may diffuse to harden the surface.

From the above-mentioned viewpoints, in the present invention, the sintering is carried out at a low temperature of 900° C. or less, specifically, at a sintering temperature of from 700° C. (desirably 760° C.) to 840° C. In addition, the sintering atmosphere is a gas atmosphere that does not contain carbon (hydrogen gas, nitrogen gas, argon gas, or the like), or a vacuum. Due to those measures, carbon and iron do not react with each other in the raw material powders, and hence the entire iron structure obtained after the sintering is formed of the soft ferrite phase αFe (HV 200 or less). Along with the sintering, the various molding aids, and the binder contained in the granulated graphite powder are vaporized from inside the sintered compact.

Note that, when the pearlite phase (γFe) is present to the extent that the pearlite phase is scattered at the grain boundary of the ferrite phase (αFe), the aggressiveness to the shaft 2 is not increased so much, and further, a suppressing effect on the wear of the bearing surface 1a can be obtained. The "grain boundary" herein refers to not only a grain boundary formed between the ferrite phases or between the ferrite phase and another grain, but also a crystal grain boundary in the ferrite phase. In order that the pearlite phase may be present at the grain boundary of the ferrite phase in the above-mentioned manner, the sintering is carried out under the conditions that the sintering temperature is set higher than the temperature exemplified above, that is, set to from 820° C. to 900° C., and gas containing carbon, such as natural gas and endothermic gas (RX gas), is used as the furnace atmosphere. With this, carbon contained in the gas diffuses into iron at the time of sintering. Thus, the pearlite phase can be formed.

Through the above-mentioned sintering step, a porous sintered compact is obtained. Sizing is carried out on this sintered compact, and thus the sintered bearing 1 illustrated in FIG. 1 is completed. The sintered bearing according to this embodiment is used as a dry bearing, and hence impregnation with lubricating oil is not performed after the sizing. As described above, at the time of sintering, carbon and iron do not react with each other so that the iron structure is formed of the soft ferrite phase. As a result, the sintered compact is likely to flow plastically at the time of sizing, and thus the sizing can be carried out with high accuracy.

In the present invention, the blending ratio of the graphite powder in the raw material powders is set to 3 wt % or more as described above. Therefore, the graphite structure can be formed in the bearing surface 1a at a ratio of 25% or more in terms of an area ratio. With this, self-lubricity of the bearing surface 1a can be improved, and the lubricating performance and conductivity of the bearing can be improved. Thus, a sintered bearing having a prolonged durability life even under the conditions of high-speed rotation and high load can be provided. In addition, the sintered bearing can also be used as a dry bearing in which its porous structure is not impregnated with lubricating oil, and hence can also be used for a portion that needs to avoid the use of lubricating oil in copying machines, printing machines (for example, magroll), electrical components for automobiles, home electric appliances, high vacuum devices, or the like. Note that, the upper limit of the area ratio of the graphite structure is set to 80%, because the strength of the bearing surface 1a is reduced when the area of the free graphite structure in the bearing surface 1a becomes excessively large.

Herein, the area ratio in the bearing surface 1a can be measured by image analysis. For example, the image analysis is performed as described below.

(1) Photographing is performed with a metallurgical microscope (ECLIPSE ME600 manufactured by NIKON CORPORATION) (100-fold magnification).
(2) Image acquisition is performed with Digital Sight DS-U3 manufactured by NIKON CORPORATION.
(3) Image processing is performed with NIS-Elements D manufactured by NIKON CORPORATION Instruments Company.
(4) Calculation of the area ratio of graphite is performed with digital image analysis software (Quick Grain manufactured by INNOTECH CORPORATION).

Further, in the present invention, the granulated graphite powder is used as the graphite powder, and hence the weight of the graphite powder per powder can be increased. With this, the difference in weight per powder between the graphite powder and the metal powder is reduced, and thus the flowability of the raw material powders can be improved. In addition, the raw material powders can be mixed uniformly. Accordingly, the variations in dimensions and bearing performance due to segregation upon mass production can be reduced, and even a bearing having a complex shape can be produced. In addition, the strengths of the green compact and the sintered compact can be improved as compared to the cases in which a great deal of graphite exists in a dispersed manner, because the existence regions of graphite in the porous structure are aggregated.

Note that, while a copper-iron-based sintered bearing using as the metal powder copper powder, iron powder, and low-melting point metal powder is given as an example of the sintered bearing in the above-mentioned description, the present invention is not limited to such sintered bearing, and can be also applied similarly to a copper-based sintered bearing using as the metal powder copper powder and low-melting point metal powder, or an iron-based sintered bearing using as the metal powder iron powder and a trace amount of copper powder.

Example 1

Next, an example product of the present invention (hereinafter referred to as a product of the present invention) is described in comparison to a related-art product not using granulated graphite powder. The product of the present invention and the related-art product are copper-based sintered bearings, unlike in the above-mentioned embodiment.

Figure 3A:
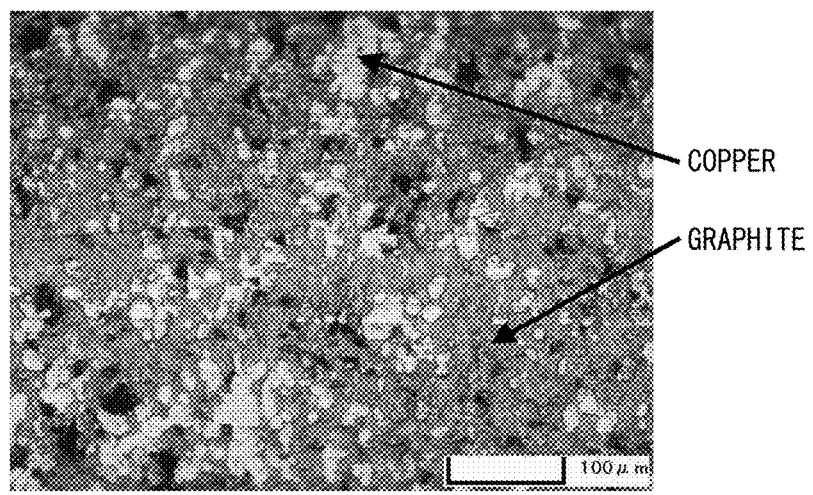
FIG. 3A is a micrograph of the bearing surface of a sintered bearing which is an example product of the present invention.
Figure 3B:
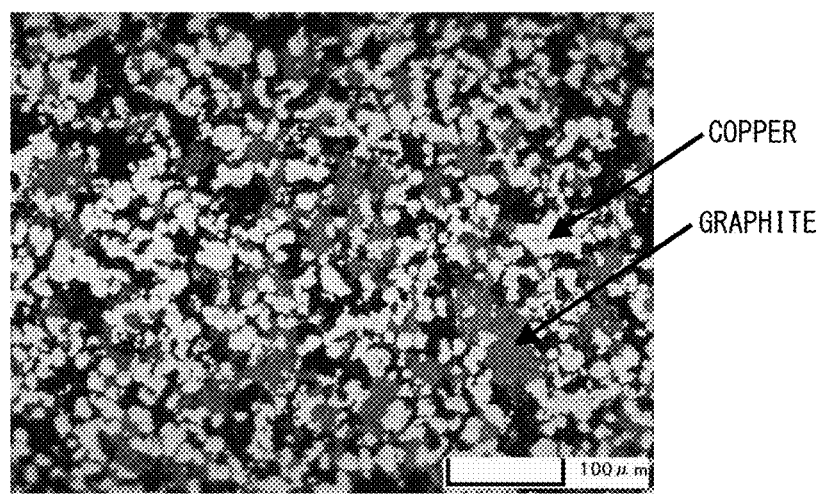
FIG. 3B is a micrograph of the bearing surface of a related-art sintered bearing.

FIGS. 3A and 3B each show an enlarged micrograph of the bearing surface 1a of the sintered bearing 1. FIG. 3A is for the product of the present invention and FIG. 3B is for the related-art product. In both the figures, a bright portion represents a copper structure (including an alloy portion with Sn), and a dark portion represents a graphite structure. A fine dark portion represents a pore that is open on the surface. It is found that the product of the present invention contains graphite in a large distribution amount as compared to the related-art product. In addition, it can be understood that graphite is dispersed uniformly in the product of the present invention. Herein, the area ratio of graphite is 28% in FIG. 3A and 78% in FIG. 3B. Note that, the area ratio was measured by the image analysis using the device and method described above.

Figure 4:
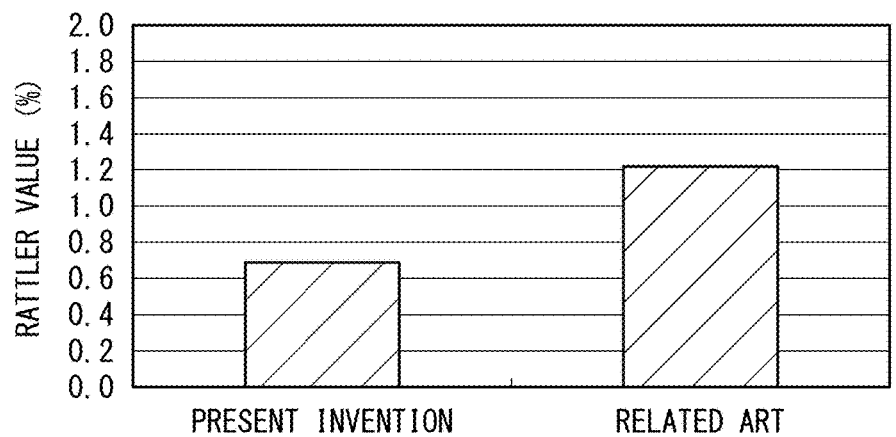
FIG. 4 is a graph showing results of a rattler test (rattler value).

FIG. 4 shows results of a rattler test performed for the evaluation of the strength of a green compact. The rattler test herein refers to a method of determining the ease of collapse of a test piece (green compact) (quantifying the strength of a green compact) based on a value calculated from a measurement result on measurement in conformity to the rattler value measurement method for metal compact (Japan Powder Metallurgy Association Standard: JSPM 4-69). A lower rattler value indicates a higher strength of the green compact. FIG. 4 reveals that the product of the present invention has a lower rattler value than the related-art product, and hence is excellent in the strength of the green compact, and chips, fractures, and the like can be suppressed.

Figure 5:
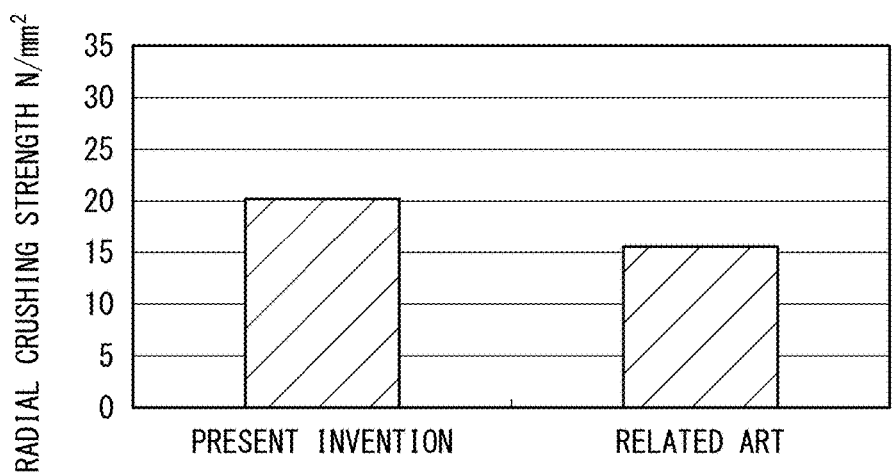
FIG. 5 is a graph showing a radial crushing strength.

FIG. 5 shows a radial crushing strength measured for the evaluation of the strength of a green compact. FIG. 5 reveals that the product of the present invention has a higher radial crushing strength than the related-art product, and hence is excellent in the strength of the green compact, and chips, fractures, and the like can be suppressed.

Figure 6:
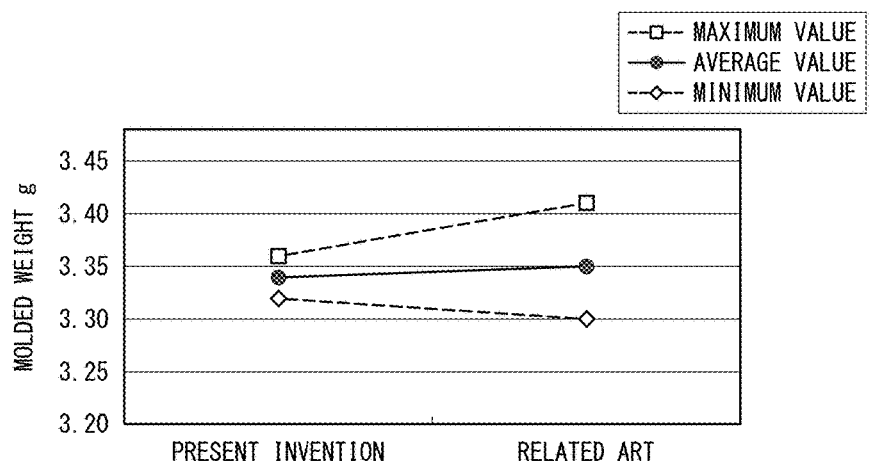
FIG. 6 is a graph showing a molded weight.

FIG. 6 shows a maximum value, an average value, and a minimum value of a molded weight measured for the evaluation of the variation in molded weight. FIG. 6 reveals that the product of the present invention has a smaller difference of the molded weight between the maximum value and the minimum value than the related-art product, and thus has a small variation of the molded weight.

Figure 7:
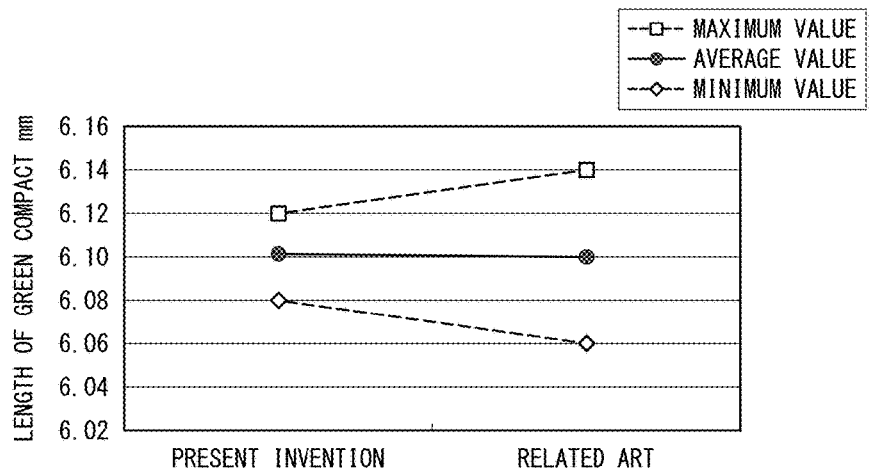
FIG. 7 is a graph showing the length of a green compact.

FIG. 7 shows a maximum value, an average value, and a minimum value of the length of a green compact measured for the evaluation of the variation in the length of a green compact. FIG. 7 reveals that the product of the present invention has a smaller difference of the length of the green compact between the maximum value and the minimum value than the related-art product, and thus has a small variation in the length of the green compact.

Figure 8:
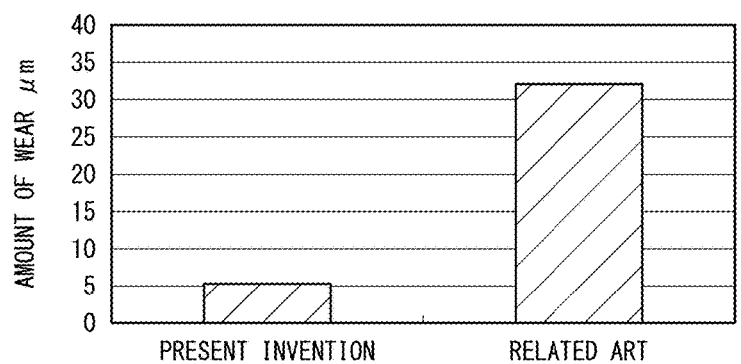
FIG. 8 is a graph showing the amount of wear on the radially inner surface of the sintered bearing.
Figure 9:
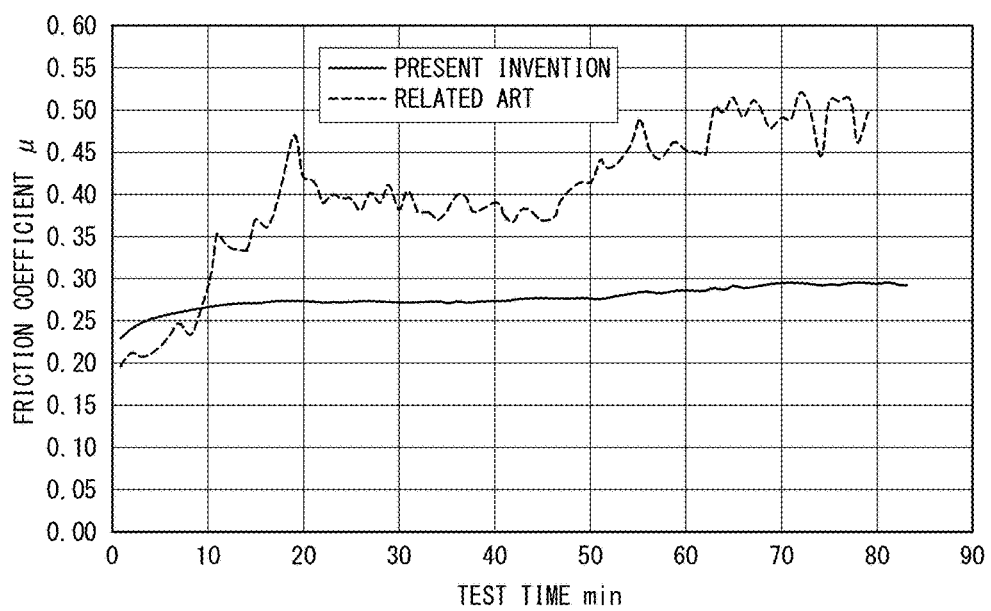
FIG. 9 is a graph showing a wear coefficient of the sintered bearing.

FIG. 8 shows the amount of wear on the radially inner surface of a bearing after operation under the conditions described below. In addition, FIG. 9 shows a change in friction coefficient upon operation under the same conditions.
Peripheral speed: V=7 m/min
Surface pressure: P=2 MPa
Temperature: 100° C.
Test shaft: SUS420J2 (HRC=50, Ra=0.4 μm)
Gap: 15 μm FIG. 8 reveals that the amount of wear on the radially inner surface of a bearing can be reduced in the product of the present invention as compared to that of the related-art product. In addition, FIG. 9 reveals that the friction coefficient can be reduced in the product of the present invention as compared to that of the related-art product after the lapse of 10 minutes.

While a bearing for supporting rotation movement of a shaft is given as an example of the sintered bearing in the above-mentioned description, the sintered bearing according to the present invention can also be used as a so-called linear bearing for supporting linear movement of a slide member such as a shaft. In addition, the sintered bearing according to the present invention can be used not only as a dry bearing not impregnated with lubricating oil, but also as an oil-impregnated bearing impregnated with lubricating oil after sizing.

REFERENCE SIGNS LIST 1 sintered bearing
1a bearing surface
2 shaft
3 mold
4 green compact

The invention claimed is:
1. A sintered bearing comprising raw material powders containing graphite powder and metal powder that have been molded in a mold and then sintered, wherein:
  the graphite powder comprises granulated graphite powder;
  a ratio of free graphite, which is derived from the granulated graphite powder, in a bearing surface of the sintered bearing is set to from 25% to 80% in terms of an area ratio; and
  an apparent density of the granulated graphite powder is set to 1.0 g/cm$^3$ or less.

2. A sintered bearing comprising raw material powders containing graphite powder and metal powder that have been molded in a mold and then sintered, wherein:
  the graphite powder comprises granulated graphite powder;
  a ratio of free graphite, which is derived from the granulated graphite powder, in a bearing surface of the sintered bearing is set to from 25% to 80% in terms of an area ratio; and
  the sintered bearing is used without being impregnated with lubricating oil.

* * * * *